United States Patent [19]

Reynolds

[11] Patent Number: 4,712,950
[45] Date of Patent: Dec. 15, 1987

[54] DRILLING FIXTURE AND WORK HOLDER

[76] Inventor: Robert L. Reynolds, 70 Stanley Ave., Landisville, Pa. 17538

[21] Appl. No.: 806,827

[22] Filed: Dec. 10, 1985

[51] Int. Cl.⁴ .......................................... B23B 49/02
[52] U.S. Cl. ............................ 408/72 R; 408/115 R; 408/241 R
[58] Field of Search ............ 408/72 R, 115 R, 241 R, 408/241 G, 72 B, 115 B, 98, 97; 10/1 R, 141

[56] References Cited

U.S. PATENT DOCUMENTS 2,409,936  10/1946  Hunt ................................ 408/72 R
3,589,825   6/1971  Wojcik ............................. 408/72 R Primary Examiner—Z. R. Bilinsky
Attorney, Agent, or Firm—Clifford B. Price

[57] ABSTRACT

The tool herein is used for guiding and ensuring the correct position for cross drilling a rod. Further, the tool will function as various types of work holders or tool holders. The tool is a cube with chamfered corners that form an eighteen sided symmetrical polygon. Each side has bored holes therein arranged in an appropriate size and location to permit the tool to be used for its many functions.

3 Claims, 3 Drawing Figures

DRILLING FIXTURE AND WORK HOLDER

BACKGROUND OF THE INVENTION

1. Field of the Invention

The invention relates to a hand tool and, more particularly, a tool for supporting material in a proper position for machining.

2. Description of the Prior Art

U.S. Pat. No. 3,589,825 discloses a tap starting guide. The shape of the guide of that patent is different from the invention herein and the guide cannot perform many of the functions of the invention herein.

SUMMARY OF THE INVENTION

The device of this invention is used for guiding and ensuring the correct position for the drill providing a cross drilling in a rod. Further, the device is used as a depth guide for drills. Also, the device, used in pairs, will function as a work holder to position material for machining.

The device consists of a one piece, uniformly square metal cube having all corners chamfered at a 45 degree angle to provide each corner with a flat surface to yield an 18 sided symmetrical polygon. Seventeen of the sides are provided with bored holes of different sizes with each hole concentric and parallel to the center line of two opposite and parallel surfaces of the cube. The eighteenth side is provided with an adjustable locking screw positioned therein.

DESCRIPTION OF THE PREFERRED EMBODIMENTS

Figure 1:
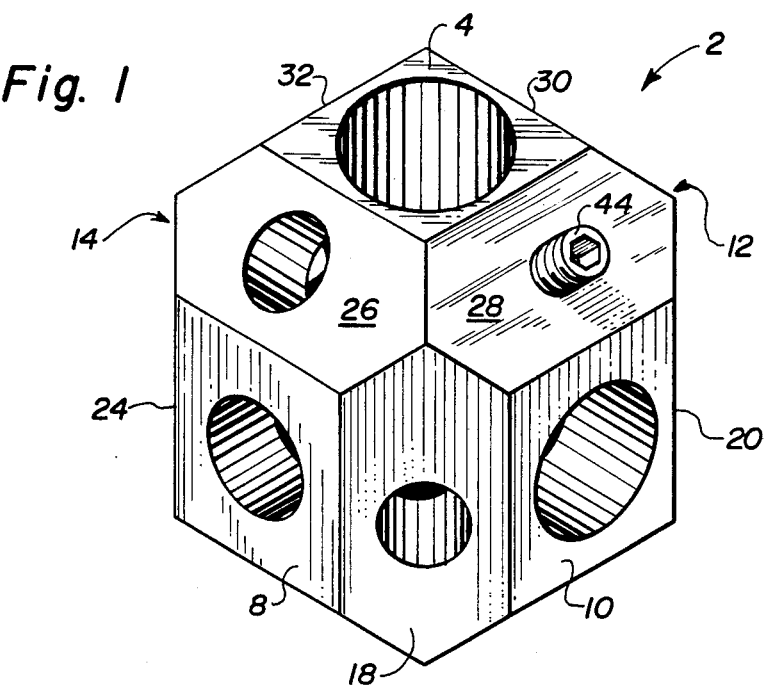
FIG. 1 is a perspective view of the invention.
Figure 2:
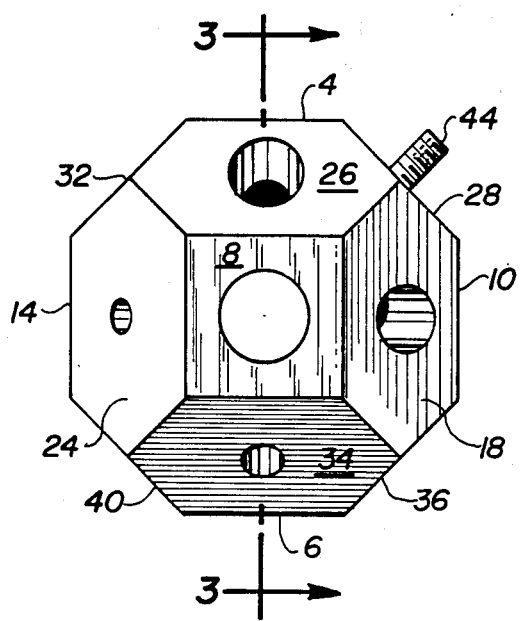
FIG. 2 is a front view of the device of FIG. 1.
Figure 3:
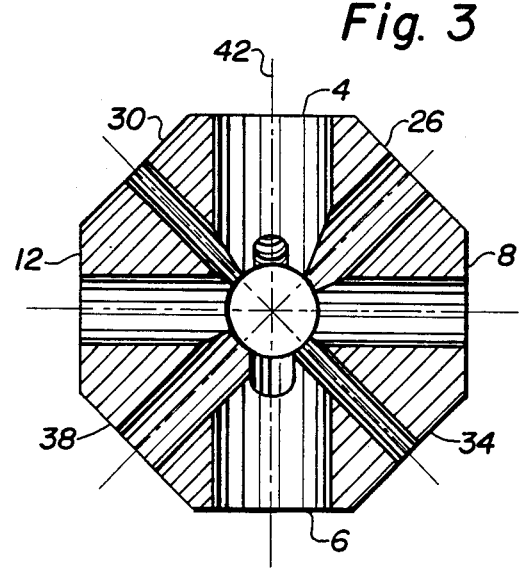
FIG. 3 is a cross section taken on line 3—3 of FIG. 2.

The invention is a multi-purpose tool used as a drill and reamer depth stop, tap starting guide, cross drilling fixture and a tool holder with a variety of applications. The device 2 of FIG. 1 consists of a uniformly square cube having a top side 4, a bottom side 6 (FIG. 2), and four other sides 8, 10, 12 and 14. As a cube, it has twelve corners and all the corners are chamfered at a 45 degree angle to provide flat surfaces that are at a 45 degree angle to the adjacent original cube surfaces. The flat surfaces on opposite sides of the cube are parallel to each other and the flat surfaces and original cube sides are all spaced the same distance from the center of the cube as shown in FIG. 3. Original cube sides 4, 6, 8, 10, 12 and 14 are spaced the same distance from the center 16 as are the chamfered surfaces 18, 20, 22, 24, 26, 28, 30, 32, 34, 36, 38 and 40. Surface 18 is between sides 8 and 10; surface 20 is between sides 10 and 12; surface 22 is between sides 12 and 14; and surface 24 is between sides 14 and 8. The four corners between side 4 and each side 8, 10, 12 and 14 are chamfered to form surfaces 26, 28, 30 and 32. Surface 26 is between sides 4 and 8; surface 28 is between sides 4 and 10; surface 30 is between sides 4 and 12; and surface 32 is between sides 4 and 14. The four corners between side 6 and each side 8, 10, 12 and 14 are chamfered to form surface 34 between sides 6 and 8; surface 36 between sides 6 and 10; surface 38 between sides 6 and 12; and surface 40 between sides 6 and 14. Therefore, the 18 sided symmetrical polygon so formed has the 18 flat surfaces all spaced the same distance, at the midpoint of each flat surface, from the center 16 of the cube. Each of the opposite flat surfaces are parallel to each other, i.e. surfaces 4 and 6, and the midpoint of each parallel flat surface is on a straight line passing through each midpoint of each of the two parallel surfaces and the center of the cube. Along each of these straight lines a drill will be passed to bore a hole in the cube through each of the parallel flat surfaces. For example, the surfaces 4 and 6 will have the straight line 42 passing through cube center 16 and the midpoints of each parallel flat surfaces 4 and 6 with a 9/16 inch hole bored concentric with the straight line 42. In total, nine straight lines are formed for nine opposed parallel flat surfaces and the following chart shows the size of the holes bored.

| Parallel Surfaces | Hole Size |
| --- | --- |
| 4,6 | 9/16 |
| 8,12 | 7/16 |
| 10,14 | ½ |
| 26,38 | ⅜ |
| 28,40 | * |
| 30,34 | 3/16 |
| 32,36 | ¼ |
| 18,22 | 5/16 |
| 20,24 | ⅛ |

*The surface 28 is provided with a locking screw 44 and the opposite parallel surface 40 has a hole size of ⅜ inch.

A second 18 sided symmetrical polygon can be formed with hole sizes as per the following chart.

| Parallel Surfaces | Hole Size |
| --- | --- |
| 4,6 | 9/16 |
| 8,12 | 7/16 |
| 10,14 | ½ |
| 26,38 | ⅜ |
| 30,34 | 5/16 |
| 32,36 | 3/16 |
| 18,22 | ¼ |
| 20,24 | ⅛ |
| 28,40 | *see above |

The locking screw 44, because it is along a straight line similar to line 42, will press against the side of any rod in any of the bored holes to lock the rod in position in the device 2 since the screw is of sufficient length to extend to the center 16 of the cube.

In use the device can be used as a drill (reamer) stop. Each of the eight different hole sizes can take a drill of the hole size or close in size thereto. The locking screw 44 will hold the device in position on the drill a set distance from the point of the drill and function to control drilling depth. When used as a cross drilling fixture, a rod 9/16 inch in diameter would pass through surfaces 4 and 6 and be held in place with locking screw 44. It could be cross drilled with holes of ½, 7/16, ⅜, 5/16, ¼ or ⅛ inches in diameter depending on the cube and hole size used to drill a hole perpendicular to the rod axis. Tapping a pre-drilled hole could be carried out by using the perpendicularly spaced holes as a guide hole for a tap. Finally, the device used alone or in pairs can hold rods in position for machining. A 9/16 inch rod can project upward from surface 4 and its upper end can be ground with the device and rod held on the magnetic bed of a grinder. Two devices could hold each end of a rod, with the rod in a horizontal position, and a flat could be cut or ground on the center of the rod.

What is claimed is:

1. A drilling fixture and work holder comprising:

(a) at least a first one piece, uniformly square cube having six flat surfaces and all of its corners chamfered at a 45 degree angle to form twelve additional flat surfaces whereby the original six sides of the cube and the twelve chamfered corners form an eighteen sided symmetrical polygon;

(b) the eighteen flat surfaces being arranged such that each surface is paired with a surface on the opposite side of the polygon to form nine paired surfaces with the two surfaces of each pair being parallel to each other;

(c) said polygon having a center point and each flat surface having a midpoint, said eighteen flat surfaces being arranged such that the midpoint of each flat surface is spaced the same distance from the center point of the polygon and said paired flat surfaces being arranged such that the midpoint of each flat surface of the pair of parallel surfaces and the center point of the polygon are along a single straight line;

(d) a plurality of nine or less, but more than two cylindrical bored holes of differing size diameters ranging from the largest size to the smallest size extending completely through the polygon, each bored hole extending from one surface to the parallel surface of each paired surface and positioned concentric with the single straight line containing the midpoint of the paired parallel surfaces to provide only one bored hole per pair of parallel surfaces; and (e) each larger size diameter bored hole normally being a means receiving and holding a rod to be drilled and each smaller size diameter bored hole perpendicular to said larger size diameter bored hole being a means receiving a drill to cross drill said rod.

2. The drilling fixture and work holder of claim 1 wherein only one flat surface has its normally bored hole threaded to receive a locking screw positioned therein, the locking screw placed therein being of sufficient length to extend approximately to the center point of the polygon.

3. The drilling fixture and work holder of claim 1 wherein said first and a second cube are provided and fastened on one piece of material to be machined whereby the two cubes support the material in a proper position for machining.

* * * * *